UNITED STATES PATENT OFFICE.

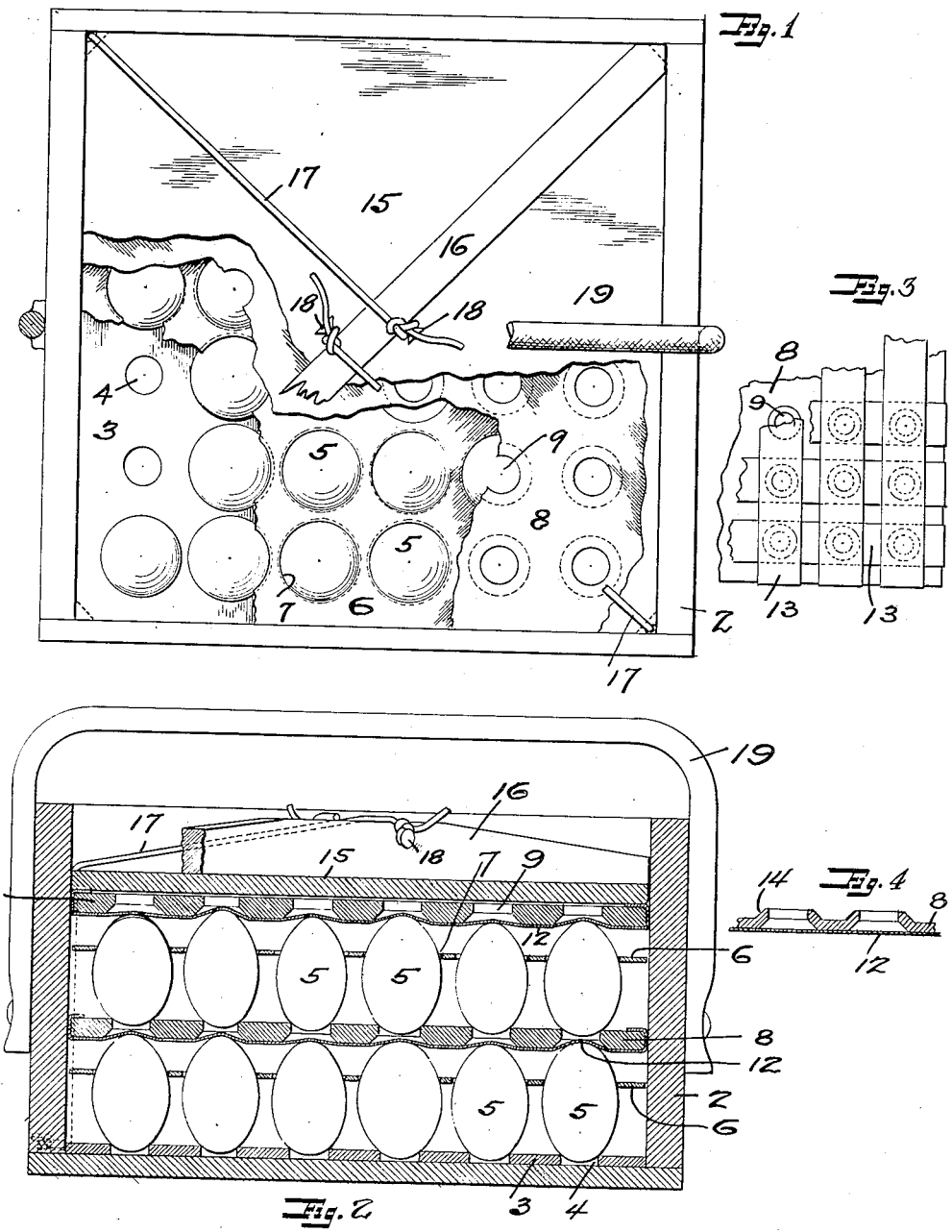

JOHN H. HENDERSON, OF OAKLAND, CALIFORNIA.

EGG-CARRIER.

1,316,304.  Specification of Letters Patent.  Patented Sept. 16, 1919.

Application filed February 6, 1918. Serial No. 215,579.

*To all whom it may concern:*

Be it known that I, JOHN H. HENDERSON, a citizen of the United States, and a resident of Oakland, county of Alameda, and State of California, have invented a certain new and useful Egg-Carrier, of which the following is a specification.

The invention relates to egg carriers and particularly to means for holding the eggs secure in the carrier.

An object of the invention is to provide an egg carrier in which the eggs are securely held so that the carrier may be shipped without causing a breakage of the eggs.

Another object of the invention is to provide an egg carrier in which the eggs are held secured by pressure, and in which substantially the same pressure is applied to each egg regardless of the varying sizes of the eggs.

The invention possesses other advantageous features, some of which, with the foregoing, will be set forth at length in the following description where I shall outline in full that form of the invention which I have selected for illustration in the drawings accompanying and forming part of the present specification.

Referring to said drawings:

Figure 1 is a plan or top view of the carrier of my invention, part thereof being broken away to disclose the interior construction.

Fig. 2 is a vertical section through the carrier.

Fig. 3 is a plan view of the underside of a portion of a modified form of egg holding plate scale.

Fig. 4 is a cross section of a modified form of plate.

The carrier of my invention consists of a box or container 2 of suitable size and strength, depending upon the number of eggs to be carried. Means are provided in the bottom of the container for holding the eggs in an upright position so they are set in place. This means preferably consists of a plate 3 of straw board or paper stock which rests on or is secured to the bottom of the carrier. The plate 3 is provided with a plurality of apertures 4 arranged in rows and spaced to accommodate the maximum number of eggs 5. The eggs are placed on this plate with the end of the egg extending into the aperture and the eggs are thereby held upright.

The eggs are held in the upright position, against displacement, by the holding plate 6, formed of straw board or paper stock. The holding plate 6 is of the same size as the interior of the container and is provided with a plurality of apertures 7 arranged and spaced to correspond to the apertures in the plate 3. The apertures 7 are larger than the apertures 4, but not as large as the diameter of the average egg, so that when placed over the upright eggs, each egg extends part way through an aperture 7, causing the plate 6 to act as a bracing means for holding the eggs upright.

The eggs are held rigid and secure in the container under end pressure and this pressure is substantially equal on all eggs regardless of the variation in length of the eggs. Bearing against the tops of the layer of eggs is a plate 8 which may act as a separator plate between layers or as a top plate over the top layer. This plate 8 is made of heavy straw board or paper stock and is provided with a plurality of apertures 9 which are alined with the apertures in the other plates. The apertures 9 are somewhat conical in shape being larger on the under side of the plate than on the upper side. The size of the aperture on the upper side is the same as that of the aperture in the bottom plate 3, and when the plate 8 serves as a separator, the upper side of the apertures 9 serve as supports for the next layer of eggs. The size of the apertures on the under side of the plate 8 are sufficient to permit the entry of the end of the egg and are made conical to produce a surface contact with the egg.

Secured to the plate 8 at the edges and overlying the under surface thereof, and covering all of the apertures therein, is a sheet of fabric 12, such as muslin or linen, which is somewhat loose, so that when the plate is pressed against the layer of eggs, the fabric is pressed into each aperture and is drawn taut forming a cushion support for the egg. By providing one piece of fabric which overlies a plurality of apertures, the fabric is drawn taut at each aperture and is differently pressed into each aperture, due to the different sizes of eggs. A long egg will depress the fabric into the aperture a greater distance than a short egg, but in so pressing into the aperture, it pulls the fabric tighter over the adjacent apertures, so that a short egg therein is subjected to the same end pressure. The eggs are therefore all subjected to the same end pressure, which is equalized over the entire layer and all of the eggs are held firmly.

Instead of using a sheet of fabric overlying the entire surface of the plate, I may use tapes 13 secured to the edges of the plate and overlying the rows of apertures. One set of parallel tapes may be used or two sets may be used, with the tapes of one set arranged at right angles to the tapes of the other set. The construction of the plate 8 may be modified as shown in Fig. 4. Instead of making the plate smooth on both surfaces and forming the conical aperture by cutting out material from the plate, the plate may be molded to produce the conical depression on one side, and a conical projection 14 on the other side.

The top plate 8 is held in position by the container cover 15 preferably made of wood and which is provided with the diagonal block 16 on its upper surface. Cords or chains 17 secured to the container at opposite corners near the bottom, extend up in the corners and are secured to pins 18 or other fastening devices on the block 16, to hold the cover firmly in position and to exert pressure on the pack. A rope bail 19 is provided for conveniently carrying the container.

I claim:

1. In an egg carrier, a plate having a plurality of apertures therein and a sheet of flexible fabric secured to the plate and overlying said apertures on one side only of the plate in engagement with said side.

2. In an egg carrier, a plate having a plurality of conical apertures therein and a sheet of flexible fabric secured to the plate at the edges and overlying said apertures in engagement with the plate throughout its entire area on one side of the plate.

3. In an egg carrier, a plate having a plurality of conical apertures therein and a sheet of flexible fabric overlying said apertures engaging the plate and adapted to be pressed into said apertures for varying distances, the sheet being sufficiently tight to prevent the egg from pressing against the sides of the aperture.

4. In an egg carrier, means for supporting the eggs vertically, a plate overlying the eggs and provided with a plurality of apertures with which the eggs register and a sheet of fabric secured to the plate and overlying said apertures and with which the ends of the eggs contact, said sheet being so attached that it is pressed into the apertures a different distance by different sized eggs while maintaining the pressure on all of the eggs substantially equal.

5. In an egg carrier, a non-yieldable plate having apertures therein and a flexible yieldable fabric sheet engaged with the plate on one side and overlying the apertures whereby said sheet may extend into the apertures.

6. In an egg carrier, a supporting plate, an apertured plate above the supporting plate and a yieldable flexible sheet of fabric engaging upon the face of the apertured plate which is opposed to the supporting plate and overlying the apertures.

7. In an egg carrier, a plate having upward projections on one side and depressions opposite the projections on the other side there being openings formed through the projections and a flexible sheet of fabric engaging with the side of the plate having the depressions therein and overlying the depressions.

In testimony whereof, I have hereunto set my hand at San Francisco, California, this 26th day of January 1918.

JOHN H. HENDERSON.

In presence of—
H. G. PROST.